(12) United States Patent
Geisberger

(10) Patent No.: US 11,460,301 B2
(45) Date of Patent: Oct. 4, 2022

(54) ANGULAR RATE SENSOR BASED ON FREQUENCY MODULATION AND DRIVE STRATEGY FOR SAME

(71) Applicant: NXP USA, Inc., Austin, TX (US)

(72) Inventor: Aaron A. Geisberger, Austin, TX (US)

(73) Assignee: NXP USA, Inc., Austin, TX (US)

( * ) Notice: Subject to any disclaimer, the term of this patent is extended or adjusted under 35 U.S.C. 154(b) by 78 days.

(21) Appl. No.: 17/189,776

(22) Filed: Mar. 2, 2021

(65) Prior Publication Data

US 2022/0282972 A1 Sep. 8, 2022

(51) Int. Cl.
*G01C 19/56* (2012.01)
*G01C 19/5712* (2012.01)
*G01C 19/5747* (2012.01)

(52) U.S. Cl.
CPC ..... *G01C 19/5747* (2013.01); *G01C 19/5712* (2013.01)

(58) Field of Classification Search
None
See application file for complete search history.

(56) References Cited

U.S. PATENT DOCUMENTS

| 6,939,473 B2 | 9/2005 | Nasiri et al. | |
| 10,760,909 B2 | 9/2020 | Geisberger | |
| 2014/0361348 A1* | 12/2014 | Yoneoka | G01P 15/125 257/254 |
| 2016/0003618 A1 | 1/2016 | Boser et al. | |
| 2016/0341550 A1* | 11/2016 | Geckeler | G01C 19/5705 |
| 2018/0112981 A1* | 4/2018 | Tocchio | G01C 19/5747 |

FOREIGN PATENT DOCUMENTS

| EP | 3257808 A1 * | 12/2017 | ........... B81B 3/0045 |
| EP | 3312559 A1 | 4/2018 | |
| EP | 3916353 A1 * | 12/2021 | ......... G01C 19/5712 |
| WO | WO-2014093727 A1 * | 6/2014 | ......... G01C 19/5755 |

OTHER PUBLICATIONS

Zega, Valentina et al; "A Dual-Mass Frequency-Modulated (FM) Pitch Gyroscope: Mechanical Design and Modelling"; IEEE Xplore; 4 pages (May 14, 2018).
Kline, Mitchell H. et al., "Quadrature FM Gyroscope", 26th International Conference on Micro Electro Mechanical Systems (MEMS), Jan. 20, 2013, pp. 604-608, IEEE, Piscataway, NJ, USA.

* cited by examiner

*Primary Examiner* — Jill E Culler
*Assistant Examiner* — Ruben C Parco, Jr.

(57) ABSTRACT

An angular rate sensor includes first and second proof masses spaced apart from a surface of a substrate. One each of first and second drive systems is interconnected with one each of the first and second proof masses. The first and second drive systems enable drive motion of the first and second proof masses along both of first and second axes in an orbital drive direction at a drive frequency, the first axis being perpendicular to the surface of the substrate and the second axis being parallel to the surface of the substrate. The sensor is sensitive to angular velocity about a third axis oriented parallel to the surface of the substrate and perpendicular to the second axis, and the drive frequency of the drive motion of the first and second proof masses changes in response to the angular velocity of the angular rate sensor about the third axis.

20 Claims, 11 Drawing Sheets

ANGULAR RATE SENSOR BASED ON FREQUENCY MODULATION AND DRIVE STRATEGY FOR SAME

TECHNICAL FIELD OF THE INVENTION

The present invention relates generally to microelectromechanical systems (MEMS) devices. More specifically, the present invention relates to a MEMS angular rate sensor device based on frequency modulation and a drive strategy for the angular rate sensor.

BACKGROUND OF THE INVENTION

An angular rate sensor, also referred to as a gyroscope, senses angular speed, rate, or velocity, also referred to as angular rate of rotation, around one or more axes. Commonly, angular rate sensors are microelectromechanical systems (MEMS) devices manufactured using MEMS technology, which provides a way to make very small mechanical structures and integrate these structures with electrical devices on a single substrate using conventional batch semiconductor processing techniques. MEMS angular rate sensors are widely used in applications such as automotive, inertial guidance systems, gaming systems, smartphones, cameras, etc.

MEMS gyroscopes operate on the basis of two differing principles: amplitude modulation and frequency modulation. Conventional amplitude modulated gyroscopes detect angular rates by demodulating the force applied to a movable sense mass from Coriolis accelerations as a result of the sense mass velocity provided from the driven frequency and amplitude. The sense mass motion is in a direction perpendicular to the drive direction and perpendicular to the angular rate vector. Amplitude modulated gyroscopes can place high demands on the sense detection as the Coriolis forces are small. In addition, the quadrature signal induced from manufacturing imperfections can be hundreds of times larger than the signal to be detected. A frequency modulated (FM) gyroscope operates by driving the movable sense mass in two drive directions, creating a circular orbit that will undergo a change in oscillation frequency if subjected to an angular velocity that is perpendicular to both driven directions.

SUMMARY

Aspects of the disclosure are defined in the accompanying claims.

In a first aspect, there is provided an angular rate sensor comprising: first and second proof masses spaced apart from a surface of a substrate, the first and second proof masses being configured to move along a first axis and a second axis, the first axis being perpendicular to the surface of the substrate and the second axis being parallel to the surface of the substrate; first drive systems; and second drive systems, one each of the first and second drive systems being interconnected with one each of the first and second proof masses, wherein the first and second drive systems are configured to enable drive motion of the first and second proof masses along both of the first and second axes in an orbital drive direction at a drive frequency, the second proof mass being driven out-of-phase relative to the first proof mass.

In a second aspect, there is provided an angular rate sensor comprising first and second proof masses spaced apart from a surface of a substrate, the first and second proof masses being configured to move along a first axis and a second axis, the first axis being perpendicular to the surface of the substrate and the second axis being parallel to the surface of the substrate; first drive systems; and second drive systems, one each of the first and second drive systems being interconnected with one each of the first and second proof masses, wherein the first and second drive systems are configured to enable drive motion of the first and second proof masses along both of the first and second axes in an orbital drive direction at a drive frequency, the second proof mass being driven out-of-phase relative to the first proof mass, wherein: each of the first drive systems comprises a first drive portion and a second drive portion, the first drive portion including a first anchor coupled to the surface of the substrate, a first paddle structure interposed between and elastically coupled to each of the first anchor and one of the first and second proof masses, and a first electrode formed on the surface of the substrate underlying the first paddle structure, and the second drive portion including a second anchor coupled to the surface of the substrate, a second paddle structure interposed between and elastically coupled to each of the second anchor and the one of the first and second proof masses, and a second electrode formed on the surface of the substrate underlying the second paddle structure, wherein the first and second paddle structures and the corresponding first and second electrodes form first parallel-plate capacitive drive elements for enabling motion of the one of the first and second proof masses along the first axis perpendicular to the surface of the substrate; and each of the second drive systems comprises first and second anchors coupled to the surface of the substrate, a frame positioned between and elastically coupled to the first and second anchors, and the frame being coupled to one of the first and second proof masses, and first electrodes surrounded by the frame to form second parallel-plate capacitive drive elements for enabling motion of the one of the first and second first proof masses along the second axis parallel to the surface of the substrate.

In a third aspect, there is provided an angular rate sensor comprising first, second, third, and fourth proof masses spaced apart from a surface of a substrate, the first, second, third, and fourth proof masses being configured to move along a first axis and a second axis, the first axis being perpendicular to the surface of the substrate and the second axis being parallel to the surface of the substrate; first drive systems; and second drive systems, one each of the first and second drive systems being interconnected with one each of the first, second, second, third, and fourth proof masses, wherein the first and second drive systems are configured to enable drive motion of the first, second, third, and fourth proof masses along both of the first and second axes in an orbital drive direction at a drive frequency, the second and fourth proof masses being driven out-of-phase relative to the first and third proof masses; the angular rate sensor is sensitive to angular velocity about a third axis oriented parallel to the surface of the substrate and perpendicular to the second axis; and the drive frequency of the drive motion of the first, second, third, and fourth proof masses is configured to change in response to the angular velocity of the angular rate sensor about the third axis.

BRIEF DESCRIPTION OF THE DRAWINGS

The accompanying figures in which like reference numerals refer to identical or functionally similar elements throughout the separate views, the figures are not necessarily drawn to scale, and which together with the detailed descrip

DETAILED DESCRIPTION

Figure 1:
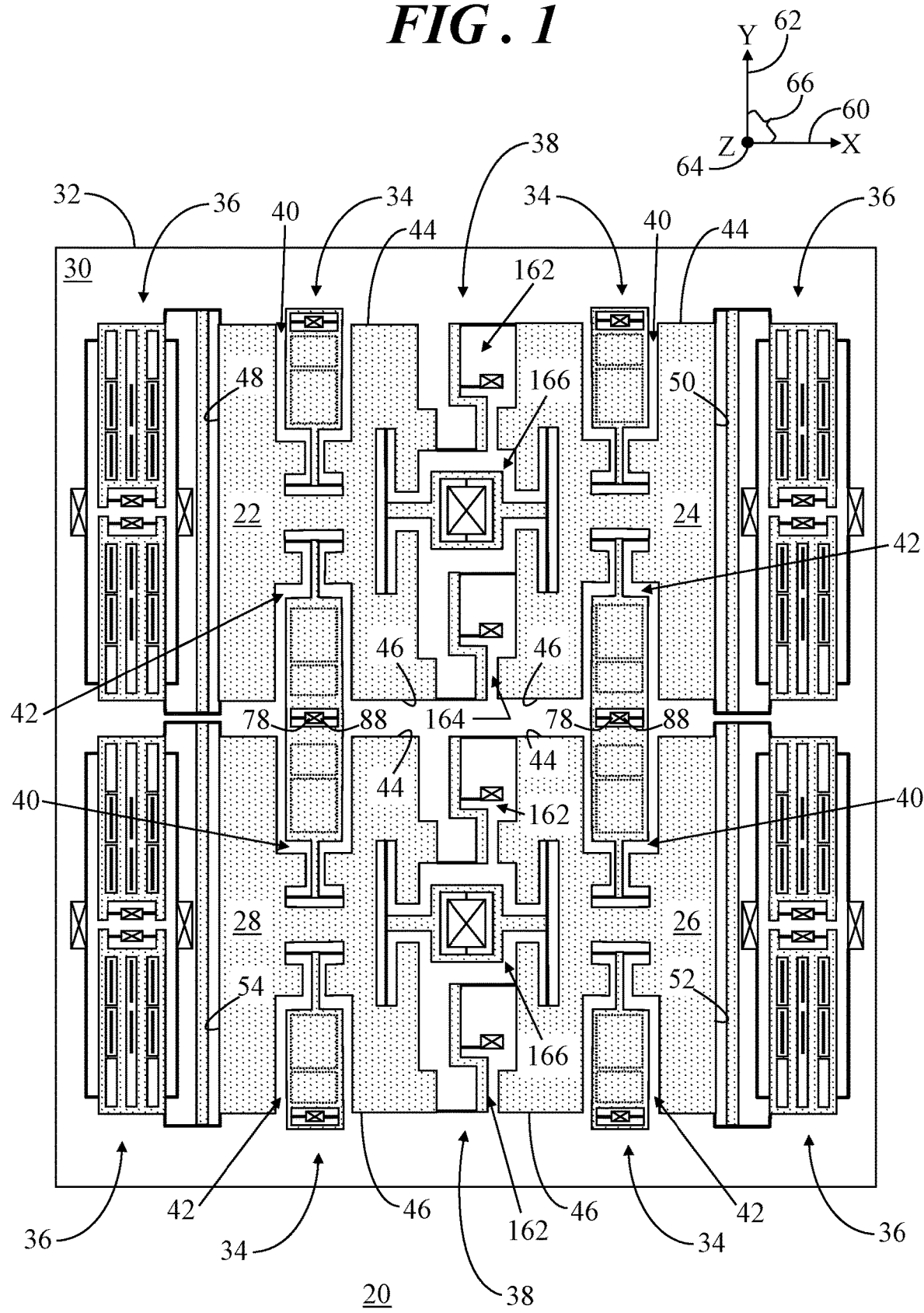
- FIG. 1 shows a top view of an angular rate sensor in accordance with an embodiment.

In overview, the present disclosure concerns microelectromechanical systems (MEMS) angular rate sensor devices based on frequency modulation. More particularly, a frequency modulated (FM) angular rate sensor includes a drive strategy for controlling drive motion of the angular rate sensor in two directions. The drive motion has an in-plane component parallel to a planar surface of the angular rate sensor and a vertical component perpendicular to the planar surface of the angular rate sensor. The drive strategy includes a first drive system for providing vertical proof mass actuation force and feedback signals on the angular rate sensor and a second drive system for providing in-plane proof mass actuation force and feedback signals. The first drive system implements vertical gap-closing actuation and feedback capacitors for controlling the vertical motion of the proof mass. The vertical gap-closing capacitors are configured to be part of structures linked to the proof masses and are not placed on the proof masses themselves. The structures pivot on anchored points allowing the proof masses to move vertically in a guided fashion. These structures additionally perform the task of limiting common mode motion of the proof masses to which they are attached. The feedback capacitors associated with the first drive system are suitably positioned to reduce nonlinear measurement output. The second drive system implements in-plane actuation and feedback capacitors, and includes a pivot structure that mimics that used for the vertical motion, thereby making the capacitance-to-motion of the proof mass transfer functions as similar as possible.

The instant disclosure is provided to further explain in an enabling fashion at least one embodiment in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, upward and downward, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching is utilized in the illustrations, the different elements within the structural layers may be formed out of the same material.

Referring to FIG. 1, FIG. 1 shows a top view of an angular rate sensor 20 in accordance with an embodiment. Angular rate sensor 20, alternatively referred to as a gyroscope, includes first, second, third, and fourth proof masses 22, 24, 26, 28 spaced apart from a surface 30 of a substrate 32. First and second proof masses 22, 24 are laterally adjacent to one another and third and fourth proof masses 26, 28 are laterally adjacent to one another. Additionally, first and fourth proof masses 22, 28 are laterally adjacent to one another and second and third proof masses 24, 26 are laterally adjacent to one another. Angular rate sensor 20 further includes first drive systems 34, second drive systems 36, and coupling structures 38.

First and second proof masses 22, 24 form a two proof mass gyroscope device. Likewise, third and fourth proof masses 26, 28 form a two proof mass gyroscope device. And linked together, first, second, third, and fourth proof masses 22, 24, 26, 28 may be considered a four proof mass gyroscope device. Although a four proof mass gyroscope device is described herein, it should be understood that the following description applies equivalently to a two proof mass gyroscope configuration.

One each of the first and second drive systems 34, 36 is interconnected with one each of the first, second, third, and fourth proof masses 22, 24, 26, 28. In an embodiment, each of first, second, third, and fourth proof masses 22, 24, 26, 28 includes first and second notched regions 40, 42 extending inwardly from opposing sidewalls 44, 46 of first, second, third, and fourth proof masses 22, 24, 26, 28. One of first drive systems 34 resides in first and second notched regions 40, 42 of first proof mass 22. Likewise, others of first drive systems 34 reside in first and second notched regions 40, 42 of corresponding second, third, and fourth proof masses 24, 26, 28. One of second drive systems 36 is coupled to first proof mass 22 proximate a first end wall 48 of first proof mass 22. Likewise, others of second drive systems 36 are coupled to second, third, and fourth proof masses 24, 26, 28 proximate corresponding second, third, and fourth end walls 50, 52, 54 of second, third, and fourth proof masses 24, 26, 28. Thus, second drive systems 36 are located outside of a boundary circumscribing first, second, third, and fourth proof masses 24, 26, 28, 30. One of coupling structures 38 is interposed between and interconnects first and second proof masses 22, 24 and another of coupling structures 38 is interposed between and interconnects third and fourth proof masses 26, 28.

First, second, third, and fourth proof masses 22, 24, 26, 28 are suspended apart from surface 32 of substrate 30 using various elastic components, rigid components, and anchors, as described herein. As used herein, an elastic component or elastic member generally refers to a resilient component that can spontaneously resume its original or normal shape after being stretched, compressed, or otherwise distorted. A stiff component generally refers to a component that is rigid, or non-bending, relative to an elastic member. As such, stiff components are largely non-compliant, and the elastic components are more compliant than the stiff components. The elastic and stiff components are suspended above the planar surface of the substrate. The elastic components may include, by way of example, coupling links, spring structures, springs, flexures, flexible support elements, and the like. While certain elastic components are depicted as bars or folded springs, it should be understood that elastic components may have other shapes that can achieve the desired compliance, such as U-shaped elastic components, J-shaped elastic components, bent bars, and so forth. The stiff components may include, by way of example, torsion bars, bar structures, beam structures, pivot linkages, isolation structures, and the like. As further used herein, an anchor is a largely rigid element that is fixed directly to the surface of the substrate and suspends the elastic and stiff components above the planar surface of the substrate. The anchors are illustrated in the figures by boxes with a "X" therein.

In the top view illustration of FIG. 1, a three-dimensional coordinate system is represented in which an X-axis 60 is directed rightward and leftward on the page, a Y-axis 62 is directed upward and downward on the page, and a Z-axis 64 is directed into and out of the page. Together, X-axis 60 and Y-axis 62 define an X-Y plane 66, with surface 30 of substrate 32 being oriented substantially parallel to X-Y plane 66 and Z-axis 64 being perpendicular to X-Y plane 66. As will be discussed in significantly greater detail below, first, second, third, and fourth proof masses 22, 24, 26, 28 are configured to move along Z-axis 64 (e.g., a first axis) perpendicular to surface 30 of substrate 32 and concurrently along X-axis 60 (e.g., a second axis) parallel to surface 30 of substrate 32. Additionally, angular rate sensor 20 is sensitive to angular velocity about Y-axis 62 (e.g., a third axis) parallel to surface 30 of substrate 32.

Figure 2:
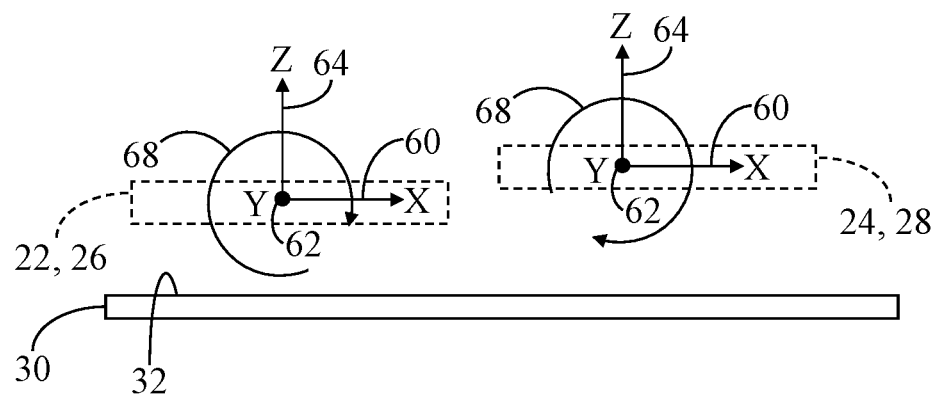
FIG. 2 shows a diagram demonstrating orbital drive directions for proof masses of the angular rate sensor of FIG. 1.

Referring to FIG. 2 in connection with FIG. 1, FIG. 2 shows a diagram demonstrating an orbital drive direction for proof masses of angular rate sensor 20. First and second drive systems 34, 36 interconnected with first proof mass 22 are configured to enable drive motion of first, second, third, and fourth proof masses 22, 24, 26, 28 along both of X- and Z-axes 60, 64 in an orbital drive direction 68. Thus, first, second, third, and fourth proof masses 22, 24, 26, 28 are configured for concurrent movement in-plane (along X-axis 60) and out-of-plane (along Z-axis 64) to yield the circular or orbital drive motion in orbital drive direction 68. Although, all four of proof masses 22, 24, 26, 28 are driven in the same direction (e.g., clockwise in this illustration), second and fourth proof masses 24, 28 are driven out of phase relative to first and third proof masses 22, 26. That is, second and fourth proof masses 24, 28 may be driven one hundred eighty degrees out of phase (e.g., in anti-phase) relative to first and third proof masses 22, 26. Accordingly, in the illustration of FIG. 2, at a given instant, first and third proof masses 22, 26 may be closer to surface 32 of substrate 30 than second and fourth proof masses 24, 28.

Thus, in accordance with embodiments discussed herein, first and second drive systems 34, 36 are configured to drive adjacent ones of first, second, third, and fourth proof masses 22, 24, 26, 28 along X- and Z-axes 60, 64 in anti-phase (e.g., 180° out of phase). Further, the configuration of first and second drive systems 34, 36 along with coupling structures 38 enable the anti-phase motion of the adjacent proof masses 22, 24, 26, 28 and effectively constrains (e.g., rejects, limits, or prevents) in-phase (e.g., common mode) motion of the adjacent first, second, third, and fourth proof masses 22, 24, 26, 28 along X- and Z-axes 60, 64. An example embodiment of first drive system 34 will be described in detail in connection with FIGS. 3-6, an example embodiment of second drive system 36 will be described in detail in connection with FIGS. 7-9, and an example embodiment of coupling structure 38 will be described in detail in connection with FIGS. 10-14. The resulting anti-phase motion of first, second, third, and fourth proof masses 22, 24, 26, 28 will be demonstrated in connection with FIGS. 15 and 16.

Figure 3:
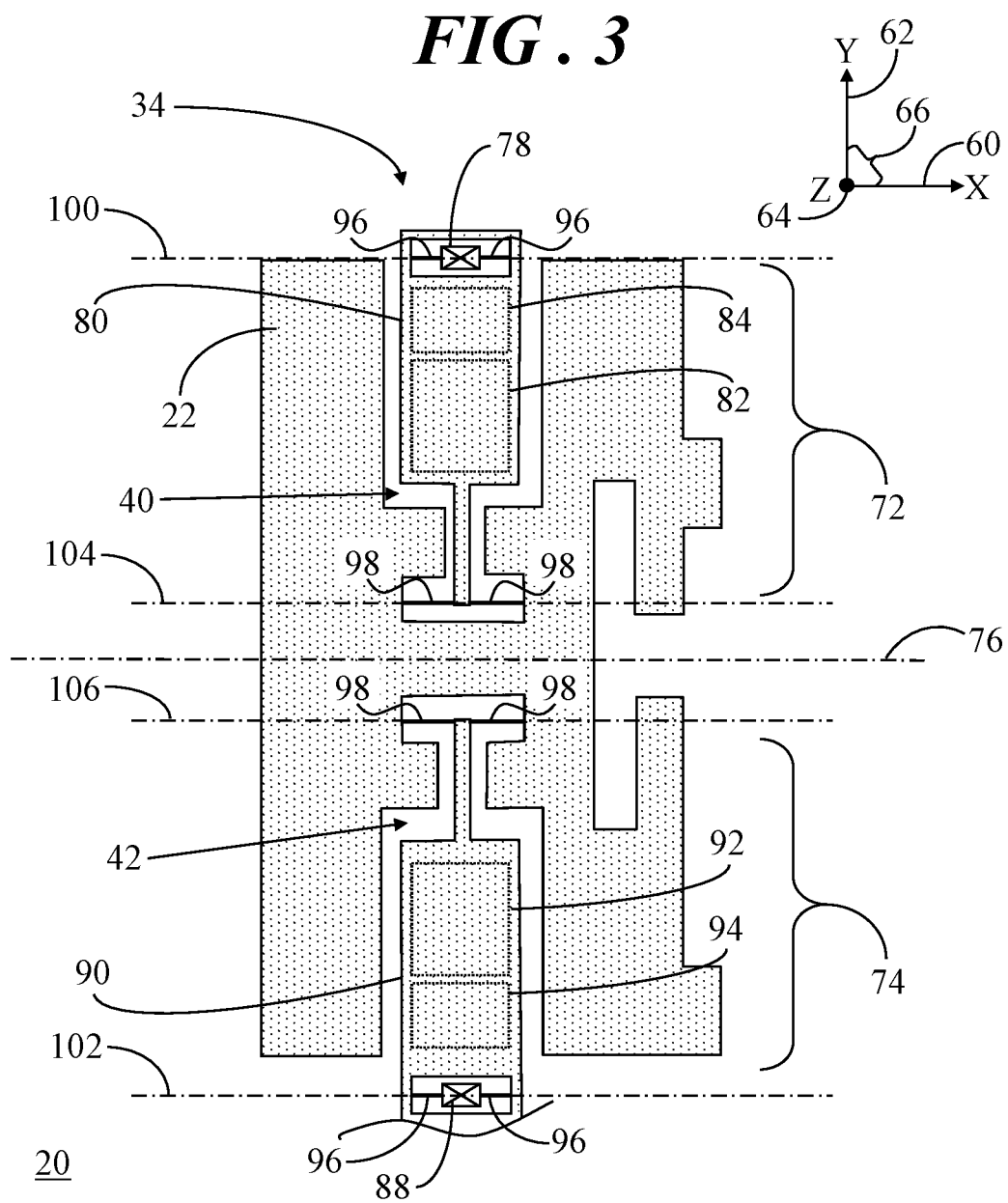
FIG. 3 shows a top view of a portion of the angular rate sensor of FIG. 1 including a first drive system.

Referring to FIG. 3 in connection with FIG. 1, FIG. 3 shows a top view of a portion of angular rate sensor 20 including one of first drive systems 34. More particularly, the example of FIG. 3 shows first drive system 34 residing in first and second notched regions 40, 42 of first proof mass 22. It should be understood that the following discussion of the structural elements of first drive system 34 shown in FIG. 3 applies equivalently to each of first drive systems 34 coupled to each of second, third, and fourth proof masses 24, 26, 28 (FIG. 1).

In accordance with an embodiment, first drive system 34 includes a first drive portion 72 and a second drive portion 74 arranged in mirror symmetry relative to an axis of symmetry 76 at a centerline of first proof mass 22. First drive portion 72 includes a first anchor 78 coupled to surface 30 (FIG. 1) of substrate 32 (FIG. 1) and a first paddle structure 80 residing in first notched region 40 and elastically coupled to each of first anchor 78 and first proof mass 22. First drive portion 72 further includes at least one actuation electrode 82 (shown in dashed line form) and at least one feedback electrode 84 (shown in dashed line form) formed on surface 30 of substrate 32 underlying first paddle structure 80. Second drive portion 74 includes a second anchor 88 coupled to surface 30 of substrate 32 and a second paddle structure 90 residing in second notched region 42 and elastically coupled to each of second anchor 88 and first proof mass 22. Second drive portion 74 further includes at least one actuation electrode 92 (shown in dashed line form) and at least one feedback electrode 94 (shown in dashed line form) formed on surface 30 of substrate 32 underlying second paddle structure 90.

It can be observed in FIG. 1 that first drive systems 34 of adjacent first and fourth proof masses 22, 28 are connected and first drive systems 34 of the adjacent second and third proof masses 24, 26 are connected. In this four proof mass configuration, second anchor 88 of first drive system 34 coupled to first proof mass 22 additionally functions as first anchor 78 of first drive system 34 coupled to fourth proof mass 28. Likewise, second anchor 88 of first drive system 34 coupled to second proof mass 24 additionally functions as first anchor 78 of first drive system coupled to third proof mass 26. Accordingly, the interconnected first drive systems 34 also function as coupling structures for constraining in-phase motion of the adjacent first and fourth proof masses 22, 28 and for constraining in-phase motion of the adjacent second and third proof masses 24, 22 along X- and/or Z-axes 60, 64.

First paddle structure 80 is interconnected to first anchor 78 via elastic members 96 and to first proof mass 22 via elastic members 98. Likewise, second paddle structure 90 is interconnected to second anchor 88 via elastic members 96 and to first proof mass 22 via elastic members 98. Elastic members 96 deform to enable pivotal drive motion of first and second paddle structures 80, 90 about respective first and second pivot axes 100, 102. As first and second paddle structures 80, 90 pivot about first and second pivot axes 100, 102, elastic members 98 deform to enable opposite pivotal motion at respective third and fourth pivot axes 104, 106 to effectively move first proof mass 22 in a direction that is opposite to the movement of first and second paddle structures 80, 90 (discussed in greater detail below).

Figure 4:
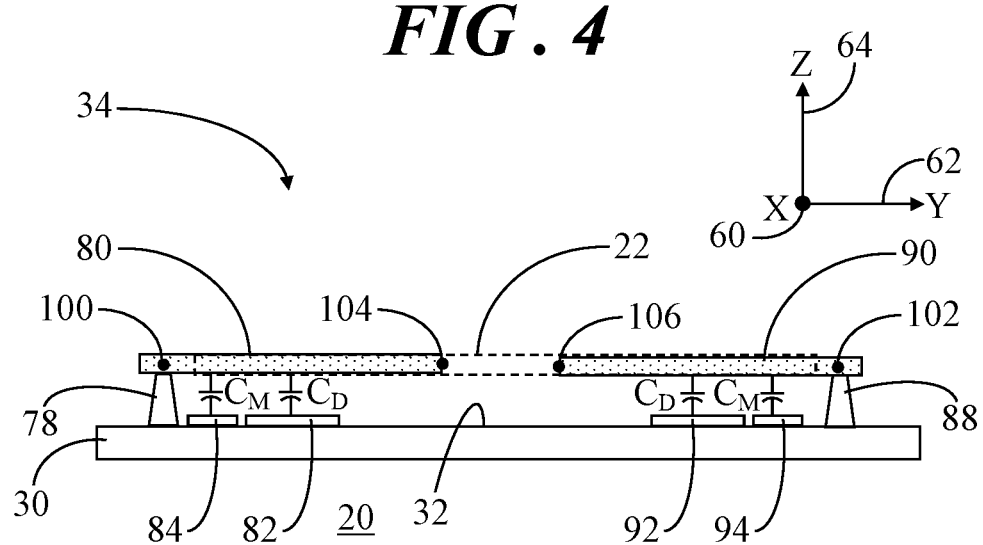
FIG. 4 shows a representative side view of the first drive system.

FIG. 4 shows a representative side view of first drive system 34. First paddle structure 80 and actuation electrode 82 form a parallel plate capacitive drive element. Likewise, second paddle structure 90 and actuation electrode 92 form a parallel plate capacitive drive element. A change in capacitance, CD, between actuation electrodes 82, 92 and respective first and second paddle structures 80, 90 can be used to drive first and second paddle structures 80, 90 and consequently, one of the proof masses (first proof mass 22 shown in dashed line form) along Z-axis 64. First paddle structure 80 and feedback electrode 84 form a parallel plate capacitive sense element. Likewise, second paddle structure 90 and feedback electrode 94 form a parallel plate capacitive sense element. A change in the sensed capacitance, CM, between feedback electrodes 84, 94 and respective first and second paddle structures 80, 90 can be used to measure, or otherwise detect, the motion of first and second paddle structures 80, 90 and consequently, the motion of one of proof masses 22, 24, 26, 28 along Z-axis 64. In the illustrated example, feedback electrodes 84, 94 are located closer to the corresponding first and second pivot axes 100, 102 than actuation electrodes 82, 92 to reduce nonlinear measurement output. Actual capacitors, CD and CM, are not present between first and second paddle structures 80, 90 and their respective electrodes 82, 84, 92, 94. Rather, the capacitor symbols shown in FIG. 3 represent the drive and sense signals, which in this example are capacitance changes.

Figure 5:
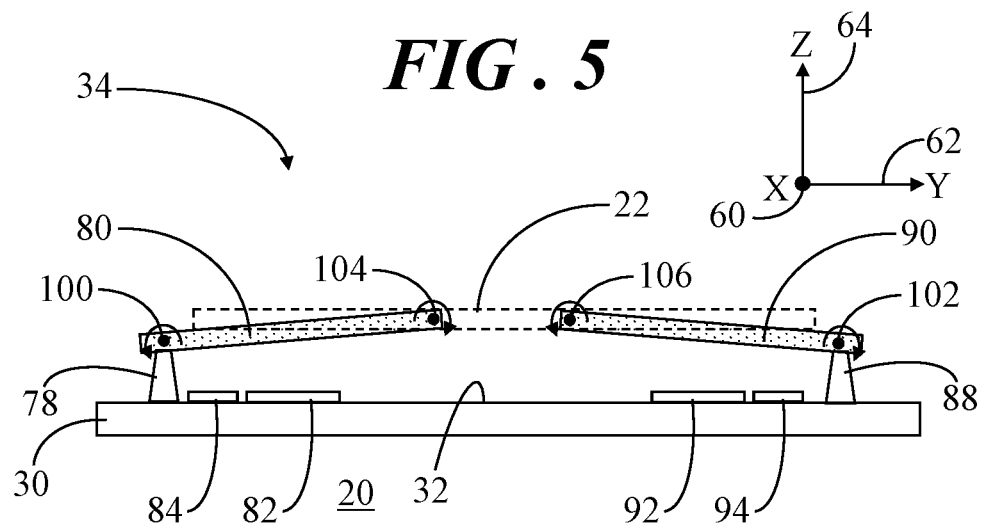
FIG. 5 shows a representative side view of the first drive system demonstrating pivotal motion.

FIG. 5 shows a representative side view of first drive system 34 demonstrating pivotal motion. In the example shown, drive signals between actuation electrodes 82, 92 and the corresponding first and second drive paddles 80, 90 causes opposite pivotal motion at first and second pivot axes 100, 102 (e.g., counterclockwise at first pivot axis 100 and clockwise at second pivot axis 102). As such, both of first and second drive paddles 80, 90 move upwardly in a direction parallel to Z-axis 64 away from surface 32 of substrate 30. Correspondingly, first proof mass 22 also moves upwardly. Pivoting motion at third and fourth pivot axes 104, 106 enables first proof mass 22 to remain substantially parallel to surface 32 of substrate 30.

Figure 6:
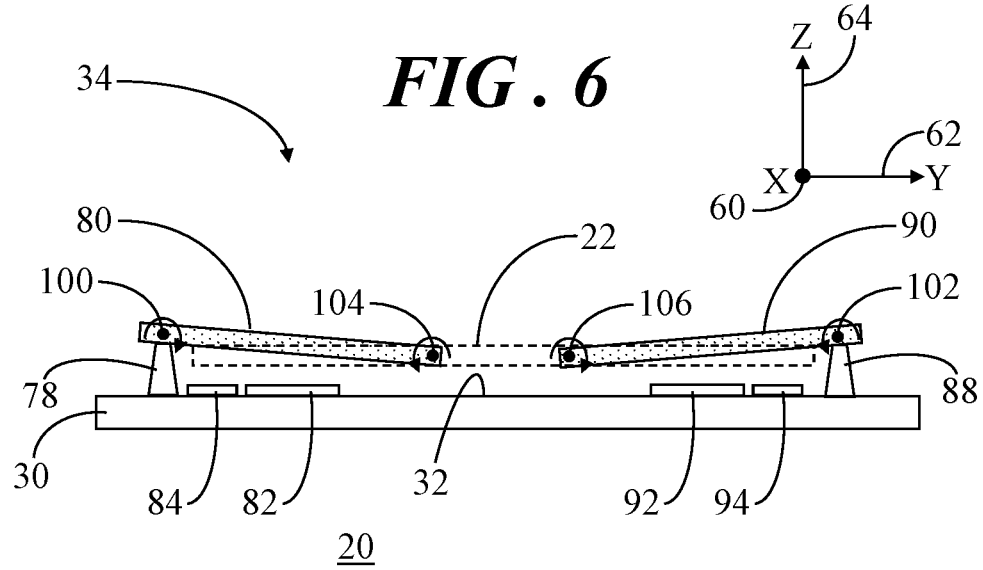
FIG. 6 shows another representative side view of the first drive system demonstrating pivotal motion.

FIG. 6 shows another representative side view of first drive system 34 demonstrating pivotal motion. In the example shown, drive signals between actuation electrodes 82, 92 and the corresponding first and second drive paddles 80, 90 causes opposite pivotal motion at first and second pivot axes 100, 102 (e.g., clockwise at first pivot axis 100 and counterclockwise at second pivot axis 102). As such, both of first and second drive paddles 80, 90 move downwardly in a direction parallel to Z-axis 64 toward surface 32 of substrate 30. Correspondingly, first proof mass 22 also moves downwardly toward surface 32 of substrate 30. Pivoting motion at third and fourth pivot axes 104, 106 again enables first proof mass 22 to remain substantially parallel to surface 32 of substrate 30.

Accordingly, the structural configuration of first drive systems 34 enables vertical gap-closing actuation and feedback capacitors for controlling the vertical motion of the proof masses in FM angular rate sensor 20. It should be understood that first drive systems 34 (in the absence of second drive systems 36) may alternatively be implemented for controlling vertical motion of proof masses in an amplitude modulated angular rate sensor.

Figure 7:
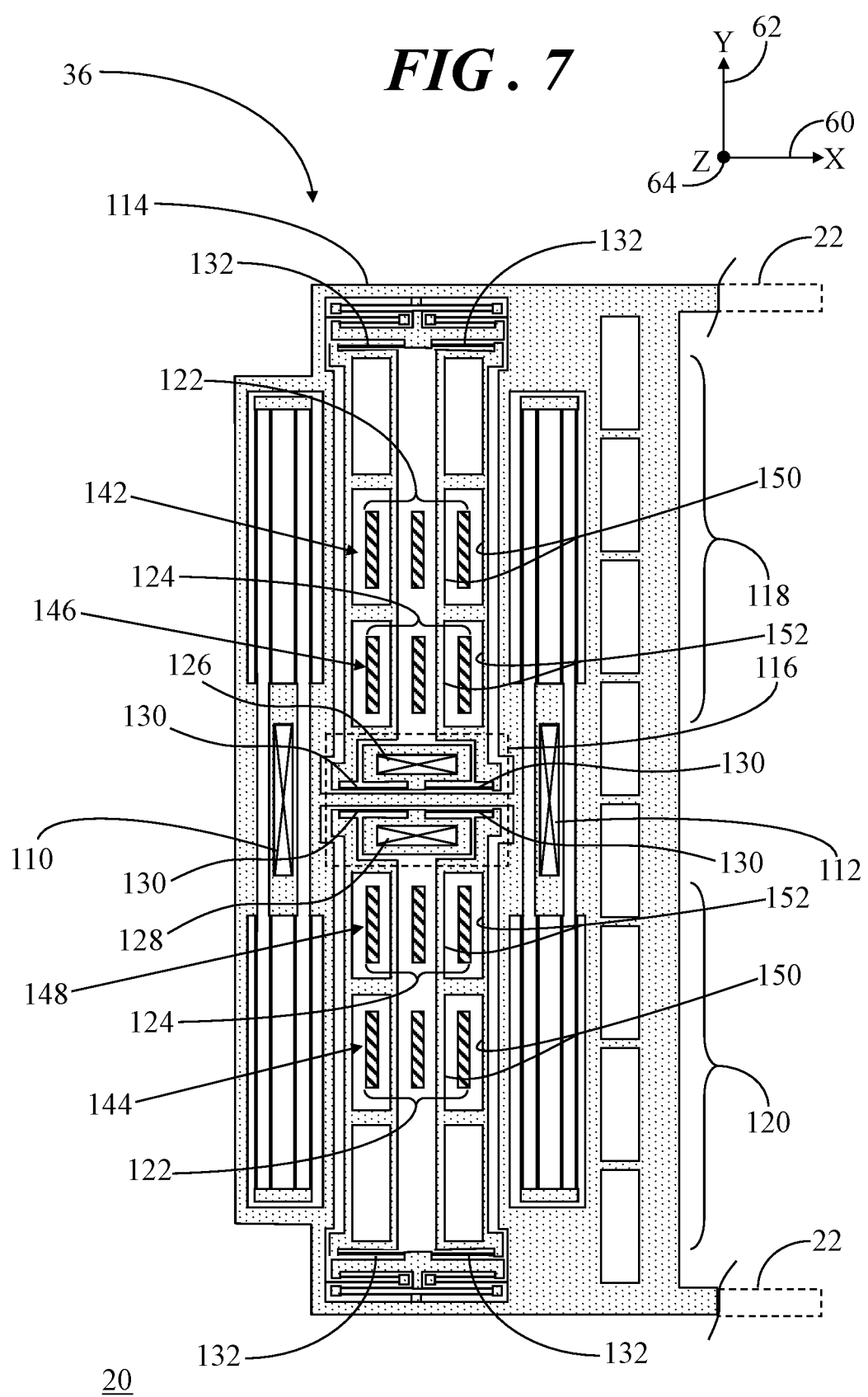
FIG. 7 shows a top view of the angular rate sensor of FIG. 1 including a second drive system.

Referring now to FIG. 7 in connection with FIG. 1, FIG. 7 shows a top view of angular rate sensor 20 including one of second drive systems 36. In accordance with an embodiment, each of the second drive systems 36 includes first and second anchors 110, 112 coupled to surface 30 of substrate 32. A stiff or rigid frame 114 is positioned between and elastically coupled to first and second anchors 110, 112. Further, frame 114 is coupled to one of proof masses 22, 24, 26, 28 (FIG. 1). For simplicity in the illustration of FIG. 7, portions of first proof mass 22 and the interconnection of first proof mass 22 with frame 114 of second drive system 36 is represented by dashed line boxes. A pivot anchor structure 116 is coupled to surface 30 (FIG. 1) of substrate 32 (FIG. 1) and is centrally located within frame 114 such that a first portion 118 of frame 114 is pivotally coupled to pivot anchor structure 116 and a second portion 120 of frame 114 is pivotally coupled to pivot anchor structure 116.

In general, actuation electrodes 122 (e.g., first electrodes) are coupled to surface 30 of substrate 32 and are surrounded by frame 114 to form parallel-plate capacitive drive elements for enabling motion of the attached one of proof masses 22, 24, 26, 28 along X-axis 60 parallel to surface 30 of substrate 32. Additionally, feedback electrodes 124 (e.g., second electrodes) are coupled to surface 30 of substrate 32 and are surrounded by frame 114 to form parallel-plate capacitive sense elements for sensing the motion of frame 114 and consequently the attached one of proof masses 22, 24, 26, 28 along X-axis 60. The motion of second drive system 36 and the corresponding proof mass 22, 24, 26, 28 along X-axis 60 will be discussed in connection with FIGS. 8 and 9.

Pivot anchor structure 116 centrally located in frame 114 includes first and second pivot anchors 126, 128 coupled to surface 30 (FIG. 1) of substrate 32 (FIG. 1). First portion 118 of frame 114 is interconnected to first pivot anchor 126 via elastic members 130 and is interconnected to one of proof masses 22, 24, 26, 28 via elastic members 132. Likewise, second portion 120 of frame 114 is interconnected to second pivot anchor 128 via elastic members 130 and is interconnected to the same one of proof masses 22, 24, 26, 28 via elastic members 132. Elastic members 130, 132 suitably deform to enable pivotal motion of first and second portions 118, 120 of frame 114 parallel to Z-axis 64, in which the pivoting motion is approximately at the center of each of elastic members 130, 132 in response to the translation of proof mass 22 along X-axis 60.

Subsets 142, 144 of actuation electrodes 122 are located on opposing sides of pivot anchor structure 116. Similarly, subsets 146, 148 of sense electrodes 124 are located on opposing sides of pivot anchor structure 116. In general, each of actuation electrodes 122 and surrounding edges 150 of frame 114 form parallel-plate capacitive drive elements for enabling drive motion of the attached one of proof masses 22, 24, 26, 28 along the in-plane axis (e.g., X-axis 60 in this example). Each of feedback electrodes 124 and surrounding edges 152 of frame 114 form parallel-plate capacitive sense elements for sensing the motion of the attached one of proof masses 22, 24, 26, 28 along the in-plane axis (e.g., X-axis 60 in this example). In some embodiments, feedback electrodes 124 are located closer to the corresponding pivot axes 134, 136 of pivot anchor structure 116 than actuation electrodes 122 to reduce the potential for nonlinear measurement output.

Figure 8:
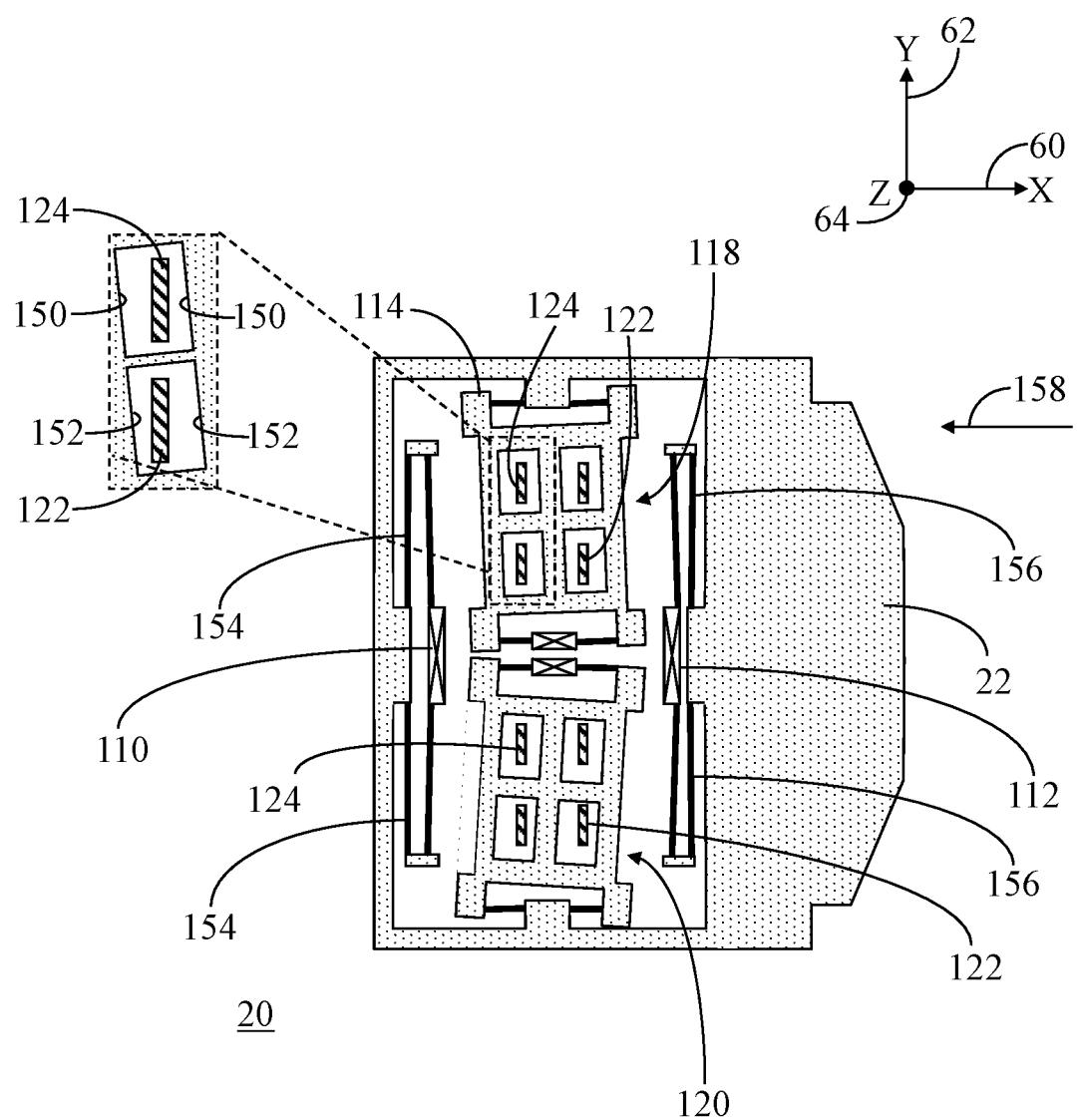
FIG. 8 shows a representative top view of a portion of the angular rate sensor demonstrating translational motion in a first direction imposed on a proof mass by the second drive system.

FIG. 8 shows a representative top view of a portion of angular rate sensor 20 demonstrating translational motion in a first direction imposed on a proof mass by the second drive system during one phase of a drive cycle. In the example shown, a spring structure 154 of second drive system 36 is interconnected between first anchor 110 and frame 114 and another spring structure 156 of second drive system 36 is interconnected between second anchor 112 and frame 114. Actuation electrodes 122 are non-movable relative to edges 150 of frame 114. Capacitive drive signals between actuation electrodes 122 and edges 150 of frame 114 cause frame 114 and consequently first proof mass 22 (in this example) to move in a direction parallel to X-axis 60. That is, spring structures 154, 156 enable in-plane translational movement of frame 114 and first proof mass 22 in the first direction, denoted by a leftward directed arrow 158, relative to first and second anchors 110, 112. Additionally, first and second portions 118, 120 pivot about Z-axis 64 in generally equal and opposite directions to accommodate the translational motion of first proof mass 22 in first direction 158. Feedback electrodes 124 are non-movable relative to edges 152 of frame 114. Thus, a change in a sensed capacitance between feedback electrodes 124 and edges 152 of frame 114 can be used to measure, or otherwise detect the motion of first proof mass 22.

Figure 9:
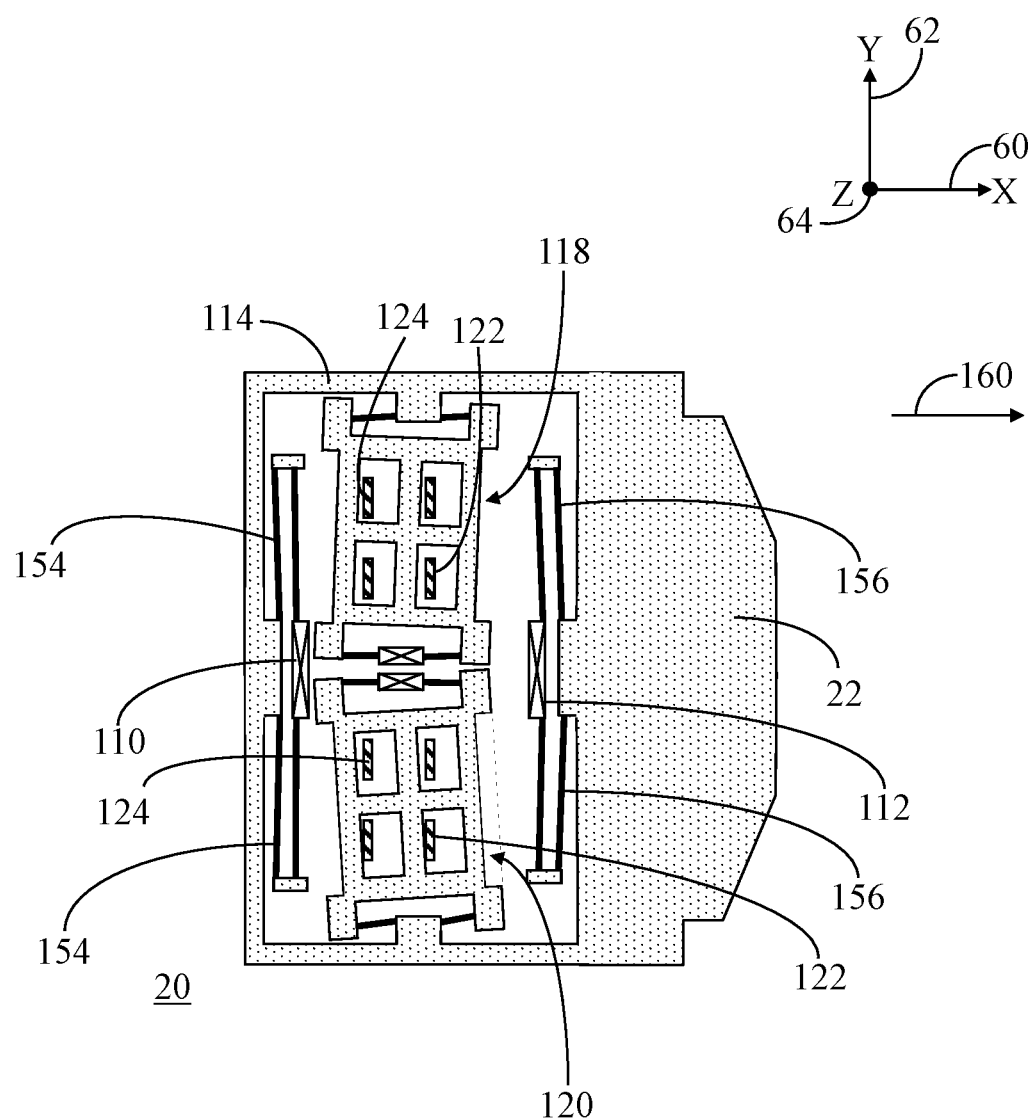
FIG. 9 shows a representative top view of a portion of the angular rate sensor demonstrating translational motion in a second direction imposed on a proof mass by the second drive system.

FIG. 9 shows a representative top view of a portion of angular rate sensor 20 demonstrating translational motion in a second direction imposed on a proof mass by the second drive system during another phase of a drive cycle. In the example shown, capacitive drive signals between actuation electrodes 122 and edges 150 (FIG. 8) of frame 114 cause frame 114 and consequently first proof mass 22 (in this example) to move in a direction parallel to X-axis 60. That is, spring structures 154, 156 enable in-plane translational movement of frame 114 and first proof mass 22 in the second direction, denoted by a rightward directed arrow 160, relative to first and second anchors 110, 112. Additionally, first and second portions 118, 120 pivot about Z-axis 64 in generally equal and opposite directions to accommodate the translational motion of first proof mass 22 in second direction 160. A change in a sensed capacitance between feedback electrodes 124 and edges 152 (FIG. 8) of frame 114 can be used to measure, or otherwise detect the motion of first proof mass 22.

Referring back to FIG. 1, in some embodiments each of coupling structures 38 includes a first pivot linkage 162, a second pivot linkage 164, and another coupling linkage 166 interposed between first and second pivot linkage portions 162, 164. In general, linkage portions 162, 164, 166 of coupling structure 38 interconnecting first and second proof masses 26, 28 allow antiphase motion of the adjacent first and second proof masses 22, 24 but exhibit higher stiffness to common mode motion of first and second proof masses 22, 24. Likewise, in the four proof mass configuration of angular rate sensor 22, linkage portions 162, 164, 166 of coupling structure 38 interconnecting third and fourth proof masses 26, 28 allow antiphase motion of the adjacent third and fourth proof masses 26, 28 but exhibit higher stiffness to common mode motion of third and fourth proof masses 26, 28.

Figure 10:
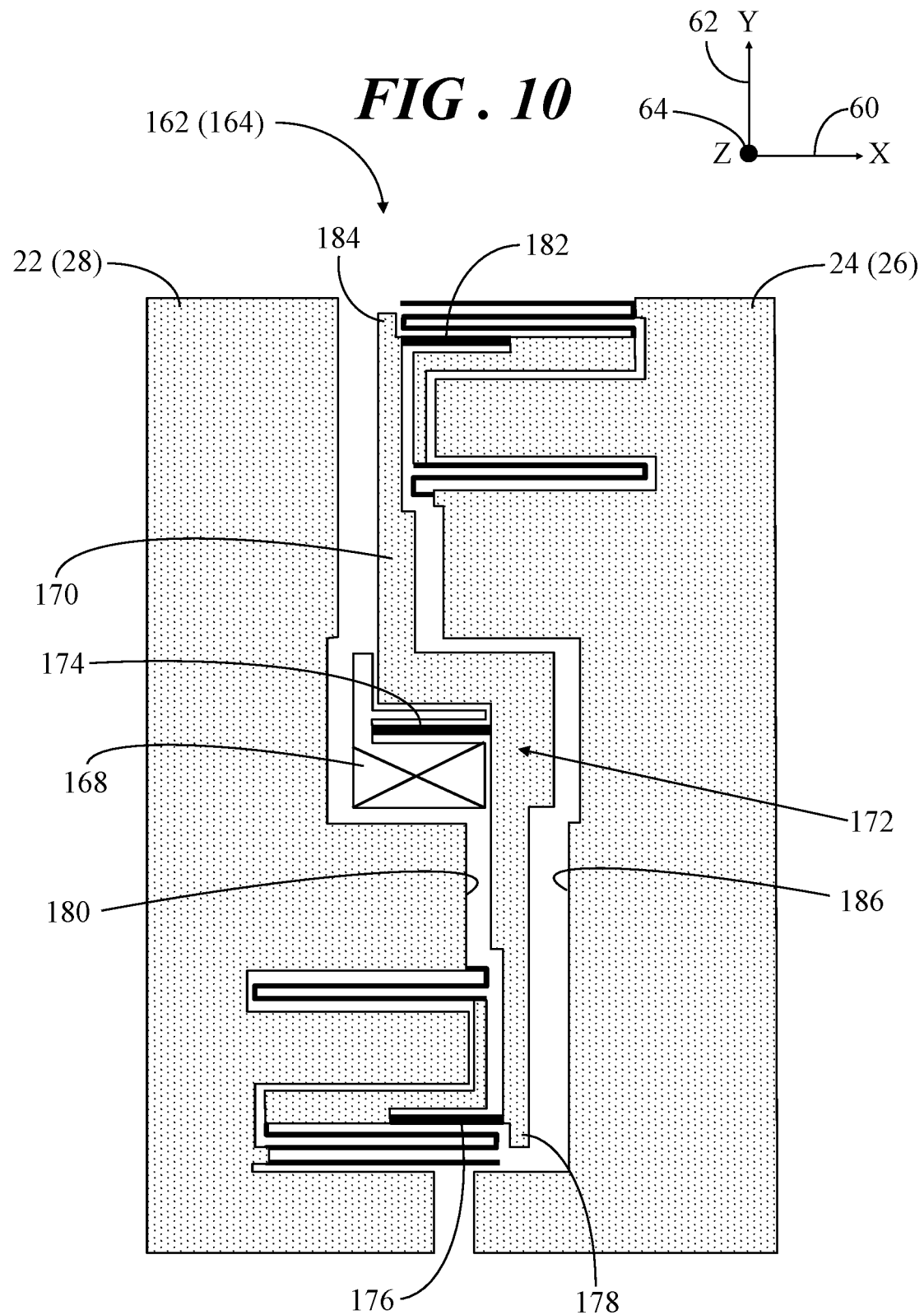
FIG. 10 shows a top view of a pivot linkage of a coupling structure that may be incorporated within the angular rate sensor of FIG. 1.

Referring now to FIGS. 1 and 10, FIG. 10 shows a top view of one of the pivot linkages that may be incorporated within angular rate sensor 20. In particular, FIG. 10 shows first pivot linkage 162 interconnecting first proof mass 22 to second proof mass 24. The following discussion applies equivalently to second pivot linkage 164 also interconnecting first proof mass 22 to second proof mass 24. Additionally, the following discussion applies equivalently to first and second pivot linkages 162, 164 interconnecting third proof mass 26 with fourth proof mass 28. Thus, FIG. 10 includes reference numerals 162 (164) denoting this equivalency. Similarly, FIG. 10 includes reference numerals 22 (28) and 24 (26) denoting the attachments of first and second pivot linkages 162, 164 to the respective first, second, third, and fourth proof masses 22, 24, 26, 28, described below.

First pivot linkage 162 includes an anchor 168 coupled to surface 32 of substrate 30 and a bar structure 170 having a middle region 172 coupled to anchor 168 by a first spring beam 174. First pivot linkage 162 further includes a second spring beam 176 coupled between an end 178 of bar structure 170 and an inner sidewall 180 (facing second proof mass 24) of first sense mass 22 and a third spring beam 182 coupled between an opposite end 184 of bar structure 170 and an inner sidewall 186 (facing first proof mass 22) of second proof mass 24. Second drive mode linkage 164 also includes anchor 168 coupled to surface 32 of substrate 30, bar structure 170 having middle region 172 coupled to anchor 168 by first spring beam 174, second spring beam 176 coupled between end 178 of bar structure 170 and inner sidewall 180 (facing second proof mass 24) of first proof mass 22, and third spring beam 182 coupled between opposite end 184 of bar structure 170 and inner sidewall 186 (facing first proof mass 22) of second sense mass 24.

In a neutral position (shown in FIG. 10), first, second, and third spring beams 174, 176, 182 are oriented substantially parallel to the in-plane direction of travel of first and second proof masses 22, 24. Thus, first, second, and third spring beams 174, 176, 182 are generally parallel to X-axis 60. However, bar structure 170 is oriented perpendicular to the in-plane direction of travel of the first and second proof masses 22, 24, and therefore generally parallel to sidewalls 180, 186 of first and second proof masses 22, 24. First, second, and third spring beams 174, 176, 182 are flexible relative to bar structure 170. As such, bar structure 170 is configured to pivot as first, second, and third spring beams 174, 176, 182 flex in response to movement of first and second proof masses relative to substrate 30 (FIG. 1).

In general, first and second pivot linkages 162, 164 interconnecting first and second proof masses 22, 24 are configured to suppress common mode motion of first and second proof masses 22, 24. Likewise, first and second pivot linkages 162, 164 interconnecting third and fourth proof masses 26, 28 are configured to suppress common mode motion of third and fourth proof masses 26, 28. That is, first and second pivot linkages 162, 164 exhibit high stiffness if first and second proof masses 22, 24 (and similarly third and fourth proof masses 26, 28) were to move in-phase along X-axis 60. However, first and second pivot linkages 162, 164 allow antiphase drive motion of first and second proof masses 22, 24 (and similarly third and fourth proof masses 26, 28). Additionally, bar structure 170 of first and second pivot linkages 162, 164 is configured to allow the antiphase vertical (e.g., Z-axis 64) drive motion of first and second proof masses 22, 24 (and similarly third and fourth proof masses 26, 28), while suppressing common mode drive motion. That is, first and second pivot linkages 162, 164 may also function to enable the antiphase vertical (e.g., parallel to Z-axis 64) displacements between first and second proof masses 22, 24 (and similarly third and fourth proof masses 26, 28) while exhibiting higher stiffness to in-phase vertical motion.

Figure 11:
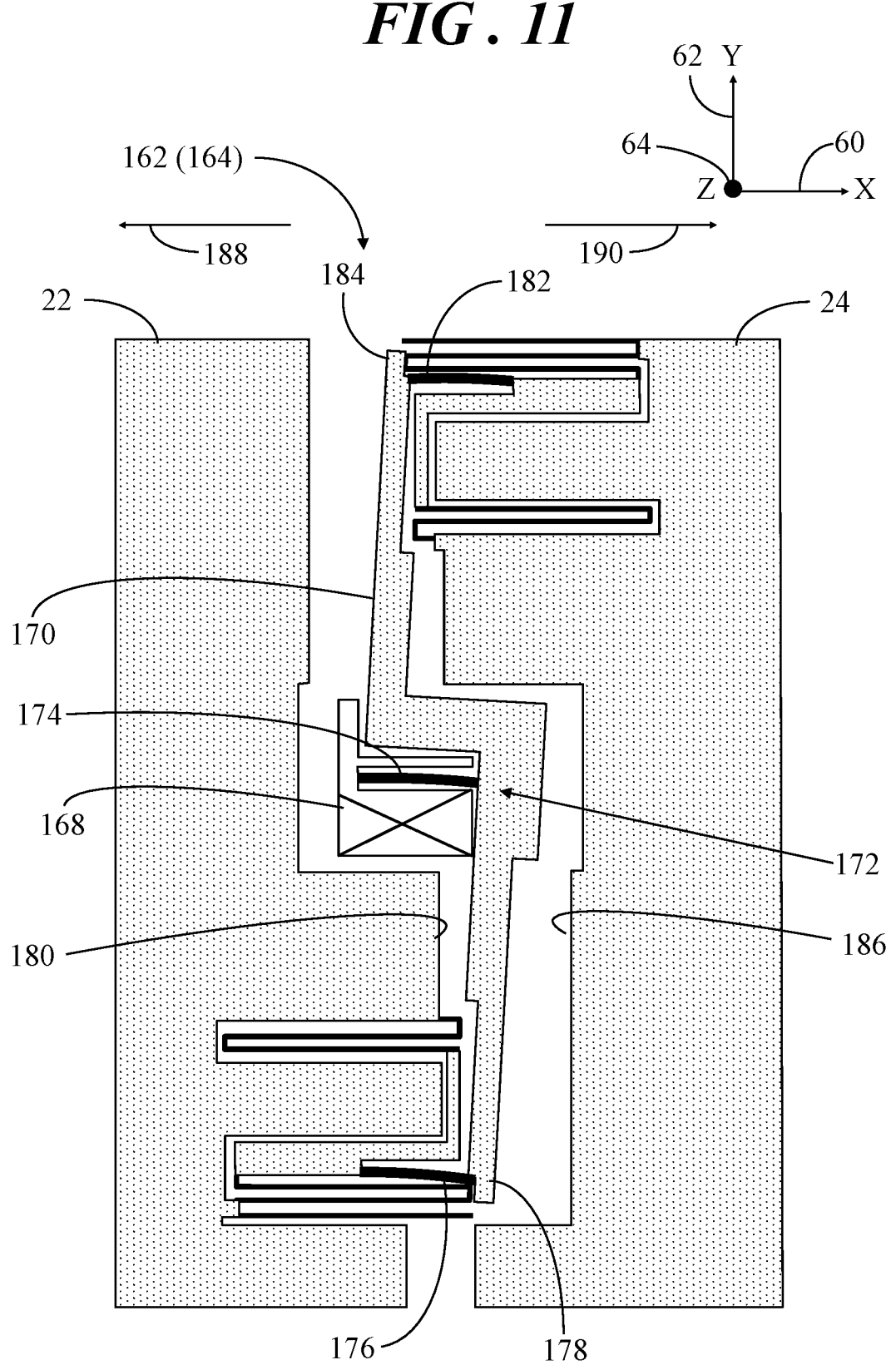
FIG. 11 shows a top view of the pivot linkage pivoting in response to external forces exerted on a pair of proof masses of the angular rate sensor.

FIG. 11 shows a top view of first pivot linkage 162 pivoting in response to a drive force exerted on first and second proof masses 22, 24 of angular rate sensor 20 (FIG. 1). In this example, when first and second proof masses 22, 24 are outwardly extended (i.e., have moved away from one another) as denoted by the outwardly directed arrows 188, 190, bar structure 170 pivots generally clockwise about a pivot axis that is approximately centered at first spring beam 174, and first, second, and third spring beams 174, 176, 182 flex in response to the outward extension of first and second proof masses 22, 24. Although not shown, when first and second proof masses 22, 24 are inwardly extended (i.e., have moved toward one another), bar structure 170 will pivot generally counterclockwise about the pivot axis that is approximately centered at first spring beam 174, and first, second, and third spring beams 174, 176, 182 flex in response to the inward extension of first and second proof masses 22, 24.

Figure 12:
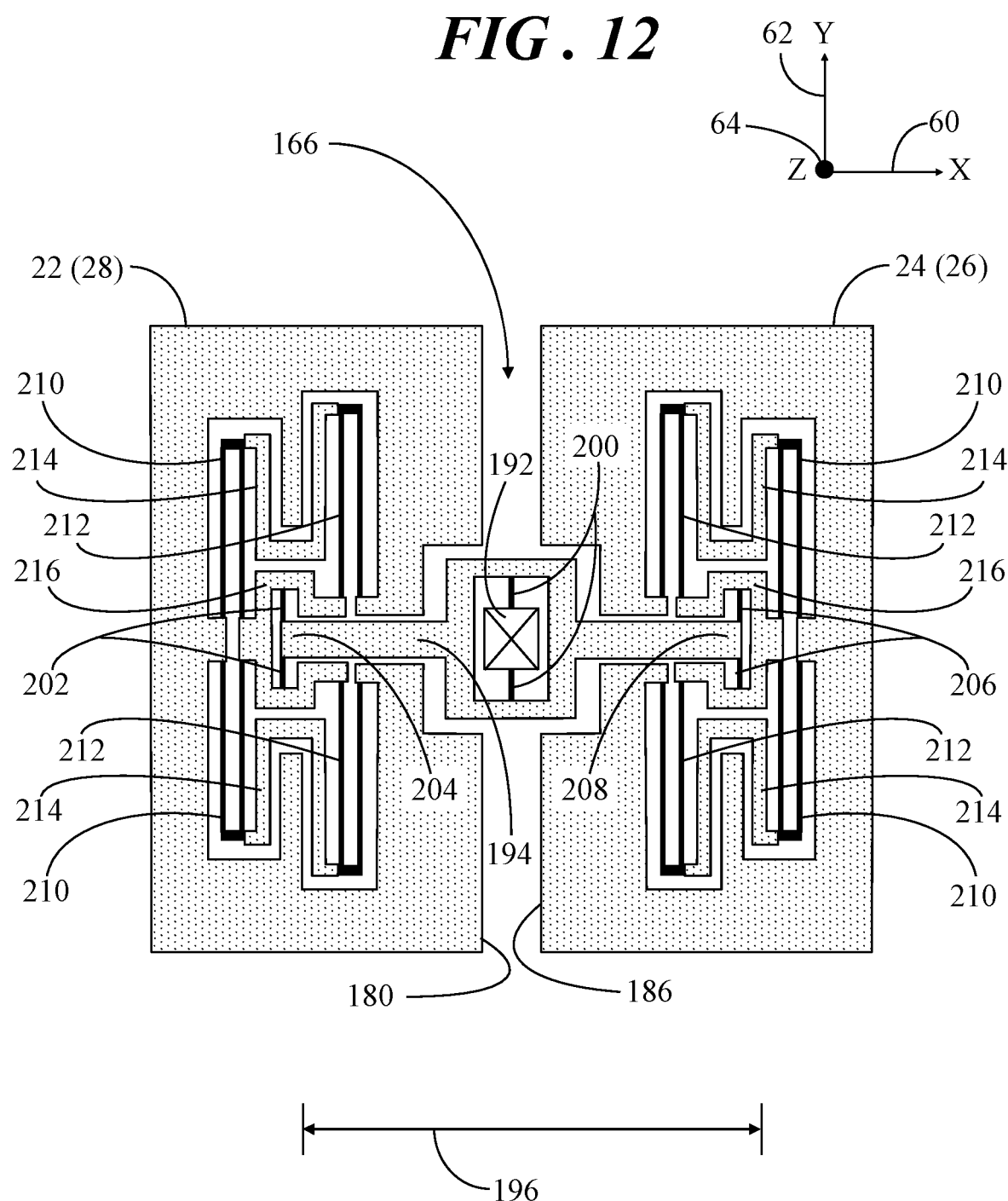
FIG. 12 shows a top view of a coupling linkage that may be incorporated within the angular rate sensor of FIG. 1.

Referring now to FIGS. 1 and 12, FIG. 12 shows a top view of coupling linkage 166 that may be incorporated within the angular rate sensor 20. In particular, FIG. 12 shows coupling linkage 166 located between and interconnecting first proof mass 22 with second proof mass 24. Additionally, coupling linkage 166 is positioned between first and second pivot linkages 162, 164, as particularly shown in FIG. 1. The following discussion applies equivalently to coupling linkage 166 located between and interconnecting third proof mass 26 with fourth proof mass 28. Thus, FIG. 12 includes reference numerals 22 (28) and 24 (26) denoting the attachments of coupling linkages 166 to the respective first, second, third, and fourth proof masses 22, 24, 26, 28, described below.

Coupling linkage 166 includes an anchor 192 coupled to surface 32 of substrate 30, a beam structure 194 having a length 196 that is aligned with X-axis 60 and having a middle region coupled to anchor 192 by a first flexure 200, a second flexure 202 coupled between an end 204 of beam structure 194 and inner sidewall 180 of first proof mass 22 (or fourth proof mass 28), and a third flexure 206 coupled between an opposing end 208 of beam structure 194 and inner sidewall 186 of second proof mass 24 (or third proof mass 26). First, second, and third flexures 200, 202, 206 may be torsion springs.

Coupling linkage 166 may further include folded spring structures 210, 212, relatively rigid linking structures 214 connected between pairs of folded spring structures 210, 212, and relatively rigid isolation structures 216. Folded spring structures 210, 212 may be interconnected between an associated one of first, second, third, and fourth proof masses 22, 24, 26, 28, and one of isolation structures 216. One of isolation structures 216 is therefore connected to two pairs of folded spring structures 210, 212 (that are connected to first proof mass 22 and to second flexure 202) and another one of isolation structures 216 is therefore connected to two pairs of folded spring structures 210, 212 (that are connected to second proof mass 24 and to third flexure 206).

In general, coupling linkage 166 interconnecting first and second proof masses 22, 24 is configured to suppress common mode drive motion of first and second proof masses 22, 24. Likewise, coupling linkage 166 interconnecting third and fourth proof masses 26, 28 is configured to suppress common mode drive motion of third and fourth proof masses 26, 28. That is, coupling linkage 166 exhibits low stiffness to antiphase vertical drive motion parallel to Z-axis 64 while exhibiting high stiffness if first, second, third, and fourth proof masses 22, 24, 26, 28 were to move in-phase along Z-axis. Folded spring structures 210, 212 allow in-plane antiphase drive motion (e.g., parallel to X-axis 60) of respective first, second, third, and fourth proof masses 22, 24, 26, 28 while linking structures 214 provide vertical (Z-axis 64) and Y-axis 62 stiffness between folded spring structures 210, 212. Further, isolation structures 216 isolate, or otherwise separate, coupling linkage 166 from the in-plane motion of folded spring structures 210, 212.

Figure 13:
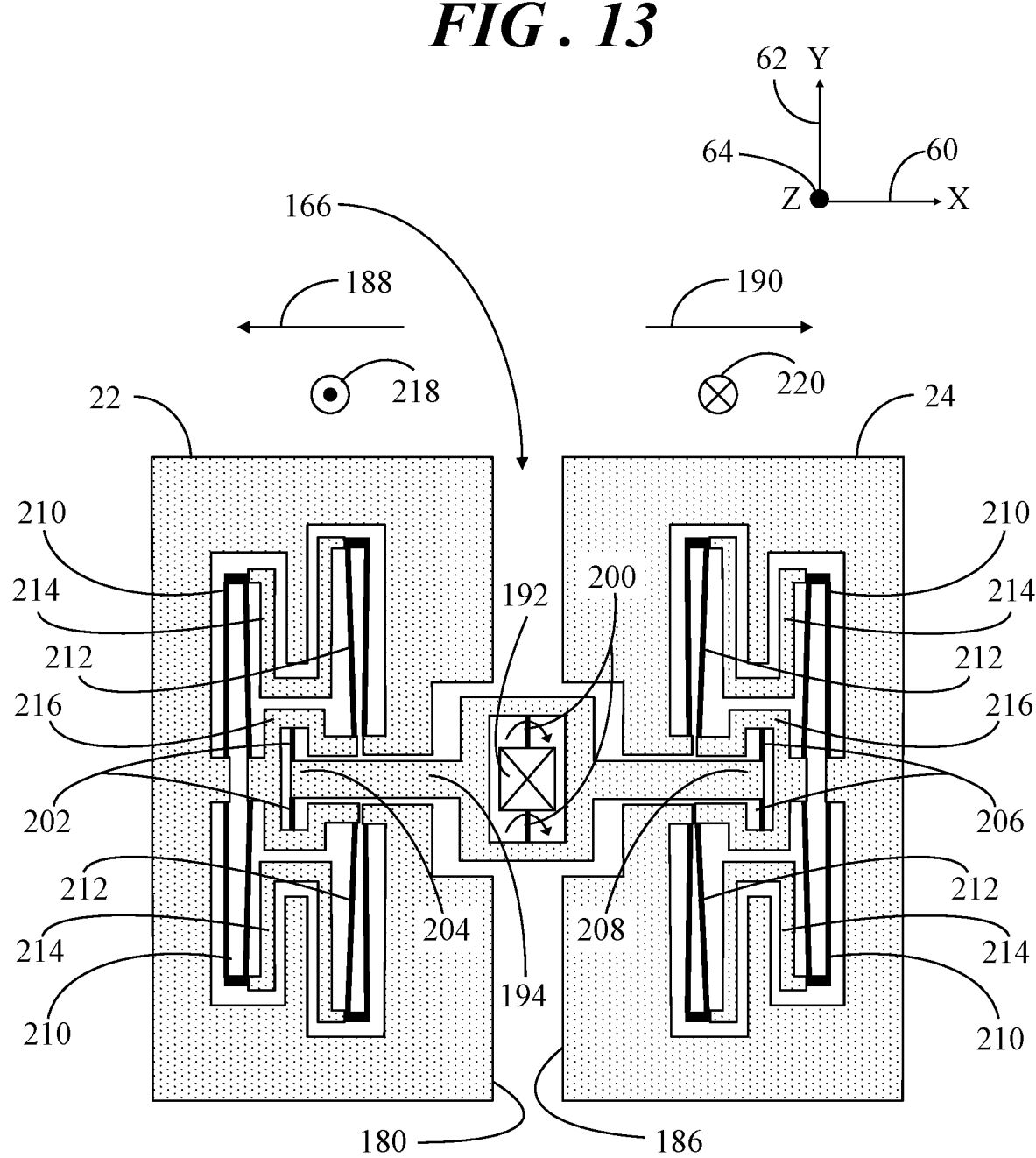
FIG. 13 shows a top view of the coupling linkage of FIG. 12 in response to external forces exerted on a pair of proof masses of the angular rate sensor.

FIG. 13 shows a top view of coupling linkage 166 in response to external forces exerted on first and second proof masses 22, 24 of the angular rate sensor 20 (FIG. 1). In this example, when first and second proof masses 22, 24 are outwardly extended (i.e., have moved away from one another) as denoted by the outwardly directed arrows 188, 190, folded spring structures 210, 212 will suitably deform to allow in-plane antiphase drive motion (e.g., parallel to X-axis 60). Isolation structures 216 isolate first, second, and third flexures 200, 202, 206 of first sense linkage 108 from this antiphase drive motion so that first, second, and third flexures 200, 202, 206 are unlikely to deform in response to the in-plane antiphase drive motion. However, first, second, and third torsion flexures 200, 202, 206 can suitably deform to allow antiphase drive motion of first and second proof masses 22, 24, as represented by symbols denoting first and second directions 218, 220 that are parallel to Z-axis 64.

Accordingly, first and second pivot linkages 162, 164 along with coupling linkage 166 enable antiphase drive motion of adjacent proof masses 22, 24, 26, 28 along both of X-axis 60 and Z-axis 64 while constraining or preventing in-phase motion (e.g., common mode motion) of adjacent proof masses 22, 24, 26, 28 along both of X-axis 60 and Z-axis 64. Of course, as mentioned previously first, second, third, and fourth proof masses 22, 24, 26, 28 are driven concurrently along both of X- and Z-axes 60, 64 to yield the circular orbit for each of proof masses 22, 24, 26, 28.

Figure 14:
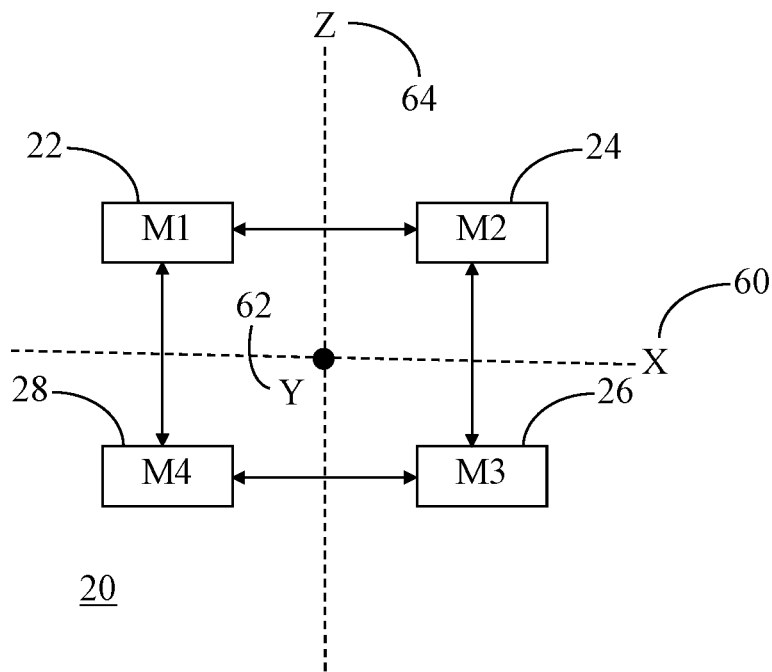
FIG. 14 shows a diagrammatic view of the proof masses of the angular rate sensor of FIG. 1 demonstrating a neutral mode.

FIG. 14 shows a diagrammatic view of first, second, third, and fourth proof masses 22, 24, 26, 28 of angular rate sensor 20 (FIG. 1) demonstrating a neutral mode. In the view of FIG. 17, X-axis 60 is oriented rightward and leftward on the page, Z-axis 64 is oriented upward and downward on the page, and Y-axis 62 is oriented into and out of the page. First and second drive systems 34, 36 and coupling structures 38 retain first, second, third, and fourth proof masses 22, 24, 26, 28 suspended above surface 32 (FIG. 1) of substrate 30 (FIG. 1). Further, first, second, third, and fourth proof masses 22, 24, 26, 28 have not yet been placed in orbital drive pattern.

Figure 15:
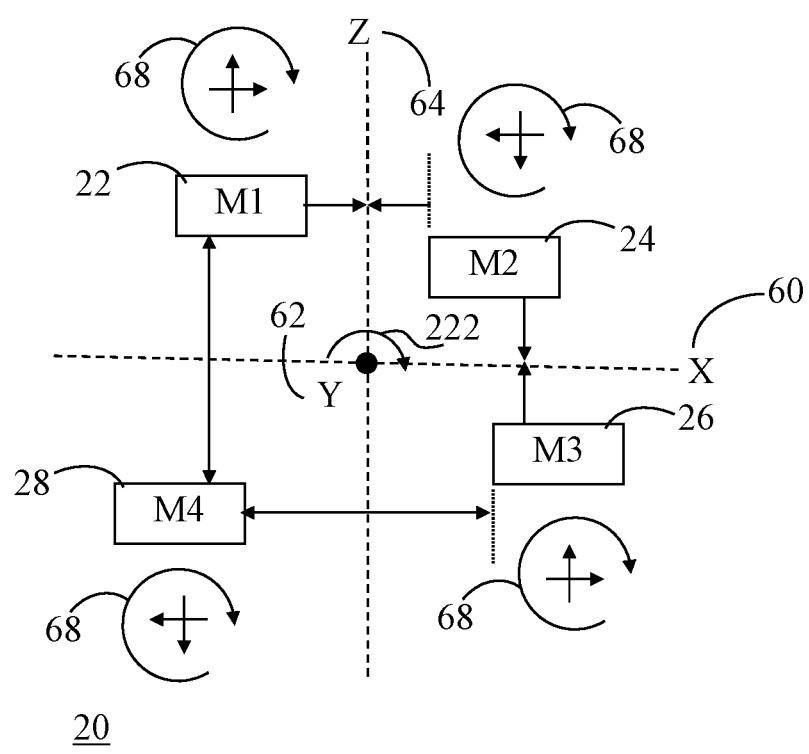
FIG. 15 shows a diagrammatic view of the proof masses of FIG. 14 demonstrating drive motion at an instant in time.

FIG. 15 shows a diagrammatic view of first, second, third, and fourth proof masses 22, 24, 26, 28 of angular rate sensor 20 (FIG. 1) demonstrating orbital drive motion at an instant in time. Again, X-axis 60 is oriented rightward and leftward on the page, Z-axis 64 is oriented upward and downward on the page, and Y-axis 62 is oriented into and out of the page. First and second drive systems 34, 36 have been actuated so that each of first, second, third, and fourth proof masses 22, 24, 26 28 move in a generally circular orbit that is parallel to an X-Z plane. Further, all of proof masses 22, 24, 26, 28 are orbiting in the same direction. However, second and fourth proof masses 24, 28 are moving approximately 180° out-of-phase relative to first and third proof masses 22, 26. Thus, as demonstrated at this instant in time, adjacent ones of first, second, third, and fourth proof masses 22, 24, 26, 28 move in anti-phase. As such, first and second proof masses 22, 24 have moved toward one another, second and third proof masses 24, 26 have moved toward one another, third and fourth proof masses 26, 28 have moved away from one another, and first and fourth proof masses 22, 28 have moved away from one another in this example.

When FM angular rate sensor 20 is subjected to angular velocity, represented by an arrow 222 about Y-axis 62, the frequency of the circular orbit of first, second, third, and fourth proof masses 22, 24, 26, 28 will undergo a frequency change in response to angular velocity 222. The frequency change of the circular orbit of first, second, third, and fourth proof masses 22, 24, 26, 28 may be compared with that of a reference frequency.

Accordingly, the "drive" and the "sense" are now two driven motions creating a circular orbiting mass (e.g., first, second, third, and fourth proof masses 22, 24, 26, 28). Each oscillation may be locked with a phase lock loop (PLL) to track frequency changes and the change in phase between the controlled oscillations to yield the angular velocity.

Embodiments described herein entail MEMS angular rate sensor devices. More particularly, a frequency modulated (FM) angular rate sensor includes a drive strategy for controlling drive motion of the angular rate sensor in two directions. The drive motion has an in-plane component parallel to a planar surface of the angular rate sensor and a vertical component perpendicular to the planar surface of the angular rate sensor. The drive strategy includes a first drive system for providing vertical proof mass actuation force and feedback signals on the angular rate sensor and a second drive system for providing in-plane proof mass actuation force and feedback signals. The first drive system implements vertical gap-closing actuation and feedback capacitors for controlling the vertical motion of the proof mass. The vertical gap-closing capacitors are configured to be part of structures linked to the proof masses and are not placed on the proof masses themselves. The structures pivot on anchored points allowing the proof masses to move vertically in a guided fashion. These structures additionally perform the task of limiting common mode motion of the proof masses to which they are attached. The feedback capacitors associated with the first drive system are suitably positioned to reduce nonlinear measurement output. The second drive system implements in-plane actuation and feedback capacitors, and includes a pivot structure that mimics that used for the vertical motion, thereby making the capacitance-to-motion of the proof mass transfer functions as similar as possible.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An angular rate sensor comprising:
first and second proof masses spaced apart from a surface of a substrate, the first and second proof masses being configured to move along a first axis and a second axis, the first axis being perpendicular to the surface of the substrate and the second axis being parallel to the surface of the substrate;
first drive systems and second drive systems;
wherein each of the first drive systems comprises a first drive portion and a second drive portion;
wherein the first drive portion includes a first anchor coupled to the surface of the substrate, a first paddle structure interposed between and elastically coupled to each of the first anchor and one of the first and second proof masses to establish a first pivot axis between the first anchor and the first paddle structure, and a first electrode formed on the surface of the substrate underlying the first paddle structure;
wherein the second drive portion includes a second anchor coupled to the surface of the substrate, a second paddle structure interposed between and elastically coupled to each of the second anchor and the one of the first and second proof masses to establish a second pivot axis between the second anchor and the second paddle structure, and a second electrode formed on the surface of the substrate underlying the second paddle structure, wherein the first and second paddle structures and the corresponding first and second electrodes form parallel-plate capacitive drive elements for enabling motion of the one of the first and second proof masses along the first axis perpendicular to the surface of the substrate; and
wherein one each of the first and second drive systems is interconnected with one each of the first and second proof masses, wherein the first and second drive systems are configured to enable drive motion of the first and second proof masses along both of the first and second axes in an orbital drive direction at a drive frequency, the second proof mass being driven out-of-phase relative to the first proof mass.

2. The angular rate sensor of claim 1 wherein:
the angular rate sensor is sensitive to angular velocity about a third axis oriented parallel to the surface of the substrate and perpendicular to the second axis; and
the drive frequency of the drive motion of the first and second proof masses is configured to change in response to the angular velocity of the angular rate sensor about the third axis.

3. The angular rate sensor of claim 1 wherein:
the first drive portion further comprises a third electrode formed on the surface of the substrate underlying the first paddle structure; and
the second drive portion further comprises a fourth electrode formed on the surface of the substrate underlying the second paddle structure, the first and second paddle structures and the corresponding third and fourth electrodes forming first parallel-plate capacitive sense elements for sensing the motion of the one of the first and second proof masses along the first axis.

4. The angular rate sensor of claim 3 wherein the third and fourth electrodes are positioned closer to the corresponding first and second pivot axes than the first and second electrodes.

5. The angular rate sensor of claim 1 wherein each of the second drive systems comprises:
first and second anchors coupled to the surface of the substrate;
a frame positioned between and elastically coupled to the first and second anchors, the frame being coupled to one of the first and second proof masses; and
first electrodes coupled to the surface of the substrate and surrounded by the frame to form parallel-plate capacitive drive elements for enabling motion of the one of the first and second proof masses along the second axis parallel to the surface of the substrate.

6. The angular rate sensor of claim 5 wherein each of the second drive systems further comprises second electrodes coupled to the surface of the substrate and surrounded by the frame to form parallel-plate capacitive sense elements for sensing the motion of the one of the first and second proof masses along the second axis.

7. The angular rate sensor of claim 6 wherein each of the second drive systems further comprises a pivot anchor structure coupled to the surface of the substrate and centrally located within the frame such that a first portion of the frame is pivotally coupled to the pivot anchor structure and a second portion of the frame is pivotally coupled to the pivot anchor structure, the first and second portions of the frame being located on opposing sides of the pivot structure, wherein subsets of each of the first and second electrodes are positioned on opposing sides of the pivot structure with the second electrodes being located closer to the pivot structure than the first electrodes.

8. The angular rate sensor of claim 1 wherein each of the first and second proof masses includes first and second notched regions extending inwardly from opposing sidewalls of the first and second proof masses, one of the first drive systems residing in the first and second notched regions of the first proof mass and another one of the first drive systems residing in the first and second notched regions of the second proof mass.

9. The angular rate sensor of claim 1 wherein one of the second drive systems is coupled to first proof mass proximate a first end wall of the first proof mass and another one of the second drive systems is coupled to second proof mass proximate a second end wall of the second proof mass.

10. The angular rate sensor of claim 1 wherein:
the first and second proof masses are adjacent to one another; and
the angular rate sensor further comprises a coupling structure interposed between and interconnecting the first and second proof masses, the coupling structure being configured to constrain an in-phase motion of the first and second proof masses along at least one of the first and second axes.

11. The angular rate sensor of claim 1 further comprising third and fourth proof masses spaced apart from the surface of the substrate, one each of the first and second drive systems being interconnected with one each of the third and fourth proof masses, wherein the first and second drive systems interconnected with the third and fourth proof masses are configured to enable drive motion of the third proof mass along both of the first and second axes in the orbital drive direction at the drive frequency, the third proof mass being driven in phase with the first proof mass and the fourth proof mass being driven in phase with the second proof mass.

12. The angular rate sensor of claim 1, further comprising:
third and fourth proof masses spaced apart from the surface of the substrate, the third, and fourth proof masses being configured to move along the first axis and the second;
wherein each of the first and second drive systems being interconnected with one each of the third and fourth proof masses wherein;
wherein the first and second drive systems are further configured to enable drive motion of the third and fourth proof masses along both of the first and second axes in the orbital drive direction at the drive frequency, the second and fourth proof masses being driven out-of-phase relative to the first and third proof masses;
wherein the angular rate sensor is sensitive to angular velocity about a third axis oriented parallel to the surface of the substrate and perpendicular to the second axis; and
wherein the drive frequency of the drive motion of the first, second, third, and fourth proof masses is configured to change in response to the angular velocity of the angular rate sensor about the third axis.

13. The angular rate sensor of claim 12 wherein each of the first drive systems comprises:
a first drive portion and a second drive portion, wherein:
the first drive portion includes a first anchor coupled to the surface of the substrate, a first paddle structure interposed between and elastically coupled to each of the first anchor and one of the first, second, third, and fourth proof masses, and a first electrode formed on the surface of the substrate underlying the first paddle structure; and
the second drive portion includes a second anchor coupled to the surface of the substrate, a second paddle structure interposed between and elastically coupled to each of the second anchor and the one of the first, second, third, and fourth proof masses, and a second electrode formed on the surface of the substrate underlying the second paddle structure, wherein the first and second paddle structures and the corresponding first and second electrodes form parallel-plate capacitive drive elements for enabling motion of the one of the first, second, third, and fourth proof masses along the first axis perpendicular to the surface of the substrate.

14. The angular rate sensor of claim 12 wherein each of the second drive systems comprises:
first and second anchors coupled to the surface of the substrate;
a frame positioned between and elastically coupled to the first and second anchors, and the frame being coupled to one of the first, second, third, and fourth proof masses; and
first electrodes surrounded by the frame to form parallel-plate capacitive drive elements for enabling motion of the one of the first, second, third, and fourth proof masses along the second axis parallel to the surface of the substrate.

15. An angular rate sensor comprising:
first and second proof masses spaced apart from a surface of a substrate, the first and second proof masses being configured to move along a first axis and a second axis, the first axis being perpendicular to the surface of the substrate and the second axis being parallel to the surface of the substrate;

first drive systems; and second drive systems, one each of the first and second drive systems being interconnected with one each of the first and second proof masses, wherein the first and second drive systems are configured to enable drive motion of the first and second proof masses along both of the first and second axes in an orbital drive direction at a drive frequency, the second proof mass being driven out-of-phase relative to the first proof mass, wherein:

each of the first drive systems comprises a first drive portion and a second drive portion, the first drive portion including a first anchor coupled to the surface of the substrate, a first paddle structure interposed between and elastically coupled to each of the first anchor and one of the first and second proof masses, and a first electrode formed on the surface of the substrate underlying the first paddle structure, and the second drive portion including a second anchor coupled to the surface of the substrate, a second paddle structure interposed between and elastically coupled to each of the second anchor and the one of the first and second proof masses, and a second electrode formed on the surface of the substrate underlying the second paddle structure, wherein the first and second paddle structures and the corresponding first and second electrodes form first parallel-plate capacitive drive elements for enabling motion of the one of the first and second proof masses along the first axis perpendicular to the surface of the substrate; and each of the second drive systems comprises first and second anchors coupled to the surface of the substrate, a frame positioned between and elastically coupled to the first and second anchors, and the frame being coupled to one of the first and second proof masses, and first electrodes surrounded by the frame to form second parallel-plate capacitive drive elements for enabling motion of the one of the first and second first proof masses along the second axis parallel to the surface of the substrate.

16. The angular rate sensor of claim 15 wherein:

the first drive portion further comprises a third electrode formed on the surface of the substrate underlying the first paddle structure; and the second drive portion further comprises a fourth electrode formed on the surface of the substrate underlying the second paddle structure, the third and fourth electrodes being positioned closer to the pivot axis than the first and second electrodes, and the first and second paddle structures and the corresponding third and fourth electrodes forming first parallel-plate capacitive sense elements for sensing the motion of the one of the first and second proof masses along the first axis.

17. The angular rate sensor of claim 15 wherein each of the second drive systems further comprises:

second electrodes surrounded by the frame to form parallel-plate capacitive sense elements for sensing the motion of the one of the first and second proof masses along the second axis; and a pivot anchor structure coupled to the surface of the substrate and centrally located within the frame such that a first portion of the frame is pivotally coupled to the pivot anchor structure and a second portion of the frame is pivotally coupled to the pivot anchor structure, the first and second portions being located on opposing sides of a pivot axis established at the pivot anchor structure, wherein subsets of each of the first and second electrodes are positioned on opposing sides of the pivot axis with the second electrodes being located closer to the pivot axis than the first electrodes.

18. The angular rate sensor of claim 15 wherein each of the first and second proof masses includes first and second notched regions extending inwardly from opposing exterior sides of the first and second proof masses, one of the first drive systems residing in the first and second notched regions of the first proof mass and another one of the first drive systems residing in the first and second notched regions of the second proof mass.

19. The angular rate sensor of claim 15 wherein one of the second drive systems is coupled to a first exterior side of the first proof mass and another one of the second drive systems is coupled to a second exterior side of the second proof mass.

20. An angular rate sensor comprising:

first and second proof masses spaced apart from a surface of a substrate, the first and second proof masses being configured to move along a first axis and a second axis, the first axis being perpendicular to the surface of the substrate and the second axis being parallel to the surface of the substrate;

first drive systems; and second drive systems;

wherein each second drive system comprises:

first and second anchors coupled to the surface of the substrate;

a frame positioned between and elastically coupled to the first and second anchors, the frame being coupled to one of the first and second proof masses;

first electrodes coupled to the surface of the substrate and surrounded by the frame to form parallel-plate capacitive drive elements for enabling motion of the one of the first and second proof masses along the second axis parallel to the surface of the substrate;

second electrodes coupled to the surface of the substrate and surrounded by the frame to form parallel-plate capacitive sense elements for sensing the motion of the one of the first and second proof masses along the second axis; and a pivot anchor structure coupled to the surface of the substrate and centrally located within the frame such that a first portion of the frame is pivotally coupled to the pivot anchor structure and a second portion of the frame is pivotally coupled to the pivot anchor structure;

wherein one each of the first and second drive systems are interconnected with one each of the first and second proof masses;

wherein the first and second drive systems are configured to enable drive motion of the first and second proof masses along both of the first and second axes in an orbital drive direction at a drive frequency, the second proof mass being driven out-of-phase relative to the first proof mass;

wherein the first and second portions of the frame are located on opposing sides of the pivot structure; and wherein subsets of each of the first and second electrodes are positioned on opposing sides of the pivot structure with the second electrodes being located closer to the pivot structure than the first electrodes.

* * * * *